United States Patent Office 3,536,751
Patented Oct. 27, 1970

3,536,751
PREPARATION OF VINYL ACETATE
Duncan Clark, Percy Hayden, and John Charlton, Norton-on-Tees, England, assignors to Imperial Chemical Industries Limited, London, England, a corporation of Great Britain
No Drawing. Filed Feb. 3, 1966, Ser. No. 524,863
Claims priority, application Great Britain, Feb. 24, 1965, 7,966/65
Int. Cl. C97c 67/04
U.S. Cl. 260—497                                                15 Claims

ABSTRACT OF THE DISCLOSURE

A palladium catalysed oxidation of ethylene carried out in the presence of a copper salt, an acetate, molecular oxygen and at most 5% by weight of water, the ratio of vinyl acetate to acetaldehyde produced being increased by carrying out the process in a reaction medium which comprises acetic acid in a concentration not exceeding 30% and 1,1-diacetoxy-ethane or 1,2-diacetoxy-ethane.

---

The present invention relates to the production of vinyl acetate, and in particular to a process for the production of vinyl acetate from ethylene.

In British patent specification No. 964,001 we have described a process comprising producing carboxylic acid esters of unsaturated alcohols by contacting ethylene with a palladium salt, either under substantially anhydrous conditions or in the presence of a minor amount of water as defined and in the presence of acetic acid, acetate ions, a redox system and molecular oxygen. In this process acetaldehyde may be formed by a byproduct.

We have now found that the ratio of vinyl acetate to acetaldehyde may be increased by carrying out the process in the presence of certain solvents and maintaining the acetic acid concentration within certain limits.

The invention is a process for the production of vinyl acetate which comprises contacting ethylene with a salt or coordination compound of palladium, in the presence of at most 5% by weight of water, and in the presence of the acetate of an alkali metal or of an alkaline earth metal or of copper, molecular oxygen, a copper salt, acetic acid and 1,1 diacetoxyethane or 1,2 diacetoxyethane, in which the concentration of the acetic acid does not exceed 30% by wieght of the reaction medium. The 1,2 diacetoxyethane is preferred for use in the process.

Preferably, the concentration of acetic acid does not exceed 20%, especially 10%, by weight of the reaction medium. Thus in the process as carried out continuously it is preferred to maintain a concentration of acetic acid sufficient only to replace that which has reacted and been removed, mainly in the form of vinyl acetate.

In general the 1,1-diacetoxyethane or 1,2-diacetoxyethane makes up substantially the balance of the reaction medium. For example if 10% by weight of the reaction medium is acetic acid, approximately 90% of the reaction medium may be one or both of the diacetoxyethanes.

The concentration of water in the reaction medium should be as low as possible, for the presence of water encourages the formation of acetaldehyde. Thus the concentration of water is less than 5% by weight of the reaction medium, more preferably less than 1%.

It is preferred to introduce the ethylene and molecular oxygen to the reaction in a gas mixture containing 3 to 10% by volume oxygen and at least twice as much ethylene. The overall operating pressure may advantageously be 300 to 500 pounds per square inch gauge, preferably 400 pounds per square inch gauge. The rate of introduction of the gas mixture may be 500 to 2000 litres per litre of reaction mixture per hour, the higher rates, for example 1600 litres per hour, being preferred to ensure rapid removal of reaction products, especially water, from the reaction zone. It is desirable that the oxygen content of the exit gas from the process after the removal of organic compounds should be about 5% by volume.

The palladium salt is preferably palladous nitrate, palladous chloride or palladous acetate, although other palladous halides such as palladous bromide may also be used. The coordination compounds of palladium include lithium chloropalladite, sodium chloropalladite and (benzonitrile) palladium II, and may be added as such or may be formed in situ. For example lithium chloropalladite may be formed in situ by the separate addition of palladous chloride and lithium chloride. The concentration of palladium used in the process may be $10^{-5}$ to $10^{-2}$ molar preferably about $5 \times 10^{-3}$ molar.

As it is advantageous for halide ions to be present, particularly chloride ions, a halide such as an alkali metal halide may be added, and my be in addition to halide added as the palladous salt or co-ordination compound of palladium or as copper halide. It is particularly desirable however that the total halide ion concentration should not exceed 0.2 molar and even more desirable that it should be 0.08 molar or below.

At low halide ion concentrations, such as $5 \times 10^{-2}$ molar and below, it is advantageous to add a nitrate or nitric acid to the reaction mixture. Suitable nitrates include the alkali metal nitrates, for example sodium nitrate. Up to 0.3 mole of nitrate or nitric acid may be added per litre of solution. Preferably 0.05 to 0.15 mole is added per litre of solution.

The alkali metal or alkaline earth metal acetate may be lithium acetate, sodium acetate, magnesium acetate, calcium acetate or barium acetate and is preferably present in the maximum concentration obtainable with reference to its solubility in the reaction medium, usually 0.1 to 0.5 molar.

The copper salt is provided to act as a redox system and during the reaction comprises both the cupric and cuprous forms, for example cupric and cuprous acetate and cupric and cuprous nitrate. The salt may be present in a molar concentration of 0.05 to 0.3 molar, preferably about 0.1 molar.

The process is preferably carried out at a temperature in the range 50° C. to 180° C., particularly 110° C. to 130° C.

The products of the process, i.e., vinyl acetate, water and byproducts, may be removed from the reaction medium in the exit gas from the process, from which they may be separated by partial condensation. The gas stream, after removal of a suitable purge and the introduction of fresh oxygen, may be returned to the reaction.

By means of this process vinyl acetate:acetaldehyde ratios of 5:1 or even higher may be obtained and additionally, the lower volatility of the diacetoxy ethanes compared with acetic acid enables vinyl acetate to be more easily separated from the reaction product than in processes carried out in a reaction medium consisting essentially of that acid alone.

In one form of the invention a gas mixture comprising 3–10% by volume oxygen, and at least twice as much ethylene, is passed continuously at a pressure between 300 and 500 pounds per square inch gauge into a reaction medium comprising 30–10% by weight acetic acid and 70–90% by weight 1,2-diacetoxyethane and at most 5% by weight of water containing lithium chloride, palladous chloride, lithium acetate and copper acetate. The temperature is maintained between 110° and 130° C. and a high gas rate of between 1200 and 2000 litres per litre of reaction mixture per hour maintained. Vinyl acetate is removed in the gas stream from the reaction medium and is recovered by condensation.

Vinyl acetate itself is a polymerisable monomer useful in the production of a wide range of plastics.

EXAMPLE 1

A gas mixture of ethylene, oxygen and nitrogen in which the partial pressures of the oxygen and ethylene were 16 and 384 lbs./square inch gauge respectively was continuously introduced into a vessel containing 1,2-diacetoxyethane—900 mls.
Acetic acid—100 mls.
Copper acetate—0.1 molar
Lithium acetate—0.1 molar
Lithium chloride—0.1 molar
Palladous chloride—$5 \times 10^{-3}$ molar The total pressure was 400 lbs./square inch gauge and the gas rate 1600 litres per hour. The temperature was 120° C.

The rate of formation of vinyl acetate was 0.6 mole/litre/hour and that of acetaldehyde 0.12 mole/litre/hour, i.e., a molar ratio of vinyl acetate:acetaldehyde of 5:1.

EXAMPLE 2

Example 1 was repeated using the following reaction medium 1,2-diacetoxy ethane—700 mls.
Acetic acid—300 mls.
Copper acetate—0.1 molar
Lithium acetate—0.5 molar
Palladous chloride—$5 \times 10^{-3}$ molar The rate of formation of vinyl acetate was 1.3 moles/litre/hour and that of acetaldehyde 0.24 mole/litre/hour, i.e., a molar ratio of vinyl acetate:acetaldehyde of 5.2:1.

EXAMPLE 3

Example 1 was repeated using the following reaction medium in which the lithium chloride and water concentrations were varied with the results shown in the table.

Reaction medium:
1,2-diacetoxyethane—800 mls.
Acetic acid—200 mls.
Copper acetate—$5 \times 10^{-2}$ molar
Lithium acetate—0.4 molar
Palladous chloride—$5 \times 10^{-3}$ molar

| | Lithium chloride concentration, molar | Water, percent by weight | Yield moles/litre/hour Vinyl acetate | Yield moles/litre/hour Acetaldehyde | Vinyl acetate: acetaldehyde molar ratio |
|---|---|---|---|---|---|
| 1 | $14 \times 10^{-2}$ | 1.9 | 0.92 | 0.26 | 3.5:1 |
| 2 | $9 \times 10^{-2}$ | 0.7 | 0.81 | 0.105 | 7.7:1 |
| 3 | $4 \times 10^{-2}$ | 0.7 | 0.63 | 0.030 | 21:1 |

Comparison of the three results shows the improvement in vinyl acetate to acetaldehyde ratio as the concentrations of chloride and water are reduced.

What is claimed is:

1. In a process for the production of vinyl acetate which comprises contacting ethylene with a salt or coordination compound of palladium, in the presence of:
   (a) at most 5% by weight of water;
   (b) the acetate of an alkali metal or of an alkaline earth metal or of copper;
   (c) molecular oxygen;
   (d) a copper salt; and
   (e) acetic acid the improvement whereby the ratio of vinyl acetate to acetaldehyde is increased, said improvement comprising carrying out said process in a liquid reaction medium which consists essentially of acetic acid in a concentration which does not exceed 30% by weight of the reaction medium and 1,1-diacetoxyethane or 1,2-diacetoxyethane.

2. A process as claimed in claim 1 in which a halide is also added to the reaction mixture in addition to any halide added as the palladium salt or coordination compound of palladium or as copper halide.

3. A process as claimed in claim 1 in which the palladium salt is palladous chloride, palladous bromide, palladous acetate or palladous nitrate.

4. A process as claimed in claim 3 in which the alkali metal or alkaline earth metal acetate is lithium acetate, sodium acetate, magnesium acetate, calcium acetate or barium acetate.

5. A process as claimed in claim 3 in which the copper salt is copper acetate or copper nitrate.

6. A process as claimed in claim 3 in which the overall operating pressure is 300 to 500 pounds per square inch gauge.

7. A process as claimed in claim 3 in which the temperature is in the range 50° C. to 180° C.

8. A process as claimed in claim 1 in which the total halide ion concentration does not exceed 0.2 molar.

9. A process as claimed in claim 8 in which the total halide ion concentration is less than $5 \times 10^{-2}$ molar and a nitrate or nitric acid is added to the reaction mixture.

10. A process as claimed in claim 9 in which the nitrate is an alkali metal nitrate.

11. A process as claimed in claim 1 for the production of vinyl acetate in which a gas mixture comprising 3–10% by volume oxygen, and at least twice as much ethylene, is passed continuously at a rate of 1200 to 2000 litres per litre of reaction mixture per hour and at a pressure between 300 and 500 pounds per square inch gauge and a temperature in the range 110 to 130° C. into a reaction medium comprising:
   (a) 30–10% by weight acetic acid;
   (b) 70–90% by weight 1,2-diacetoxyethane;
   (c) an alkali metal halide;
   (d) $10^{-5}$ to $10^{-2}$ molar of a palladium salt;
   (e) 0.1 to 0.5 molar of an alkali or alkaline earth metal acetate;
   (f) a total halide ion concentration which does not exceed 0.2 molar;
   (g) 0.05 to 0.3 molar of a copper salt; and
   (h) at most 5% by weight of water; and vinyl acetate is removed in the gas stream from the reaction medium and recovered.

12. A process as claimed in claim 11 in which the palladium salt is palladous chloride, palladous bromide, palladous acetate or palladous nitrate.

13. A process as claimed in claim 12 in which the alkali metal acetate is sodium or lithium acetate.

14. A process as claimed in claim 13 in which the copper salt is copper acetate or copper nitrate.

15. A process as claimed in claim 14 in which the alkali metal halide is lithium chloride, the vinyl acetate is recovered by condensation from the gas stream and the molar ratio of vinyl acetate to acetaldehyde byproduct is at least 5:1.

References Cited

UNITED STATES PATENTS 3,260,739 7/1966 Schaeffer _____ 260—497
3,277,158 10/1966 Schaeffer _____ 260—497

FOREIGN PATENTS 615,596 9/1962 Belgium.
975,709 11/1964 Belgium.

JAMES A. PATTEN, Primary Examiner

V. GARNER, Assistant Examiner

U.S. Cl. X.R.

260—604